Patented Mar. 11, 1930

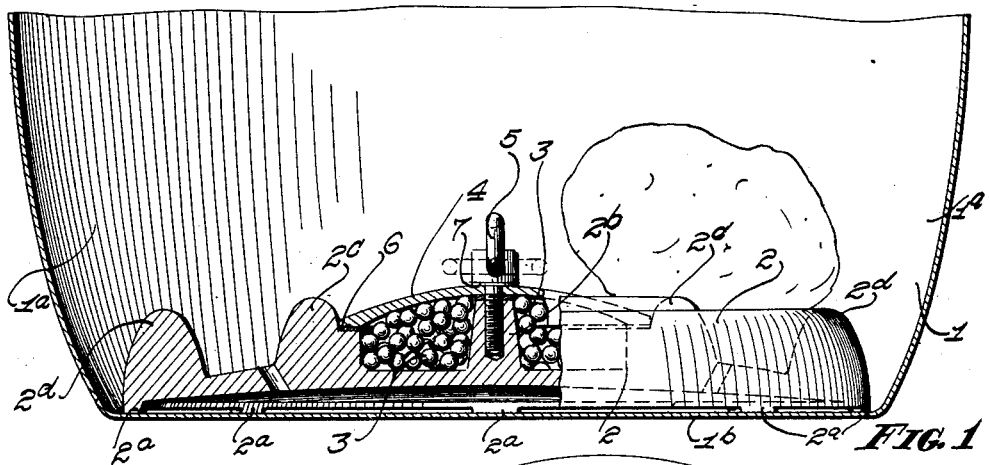

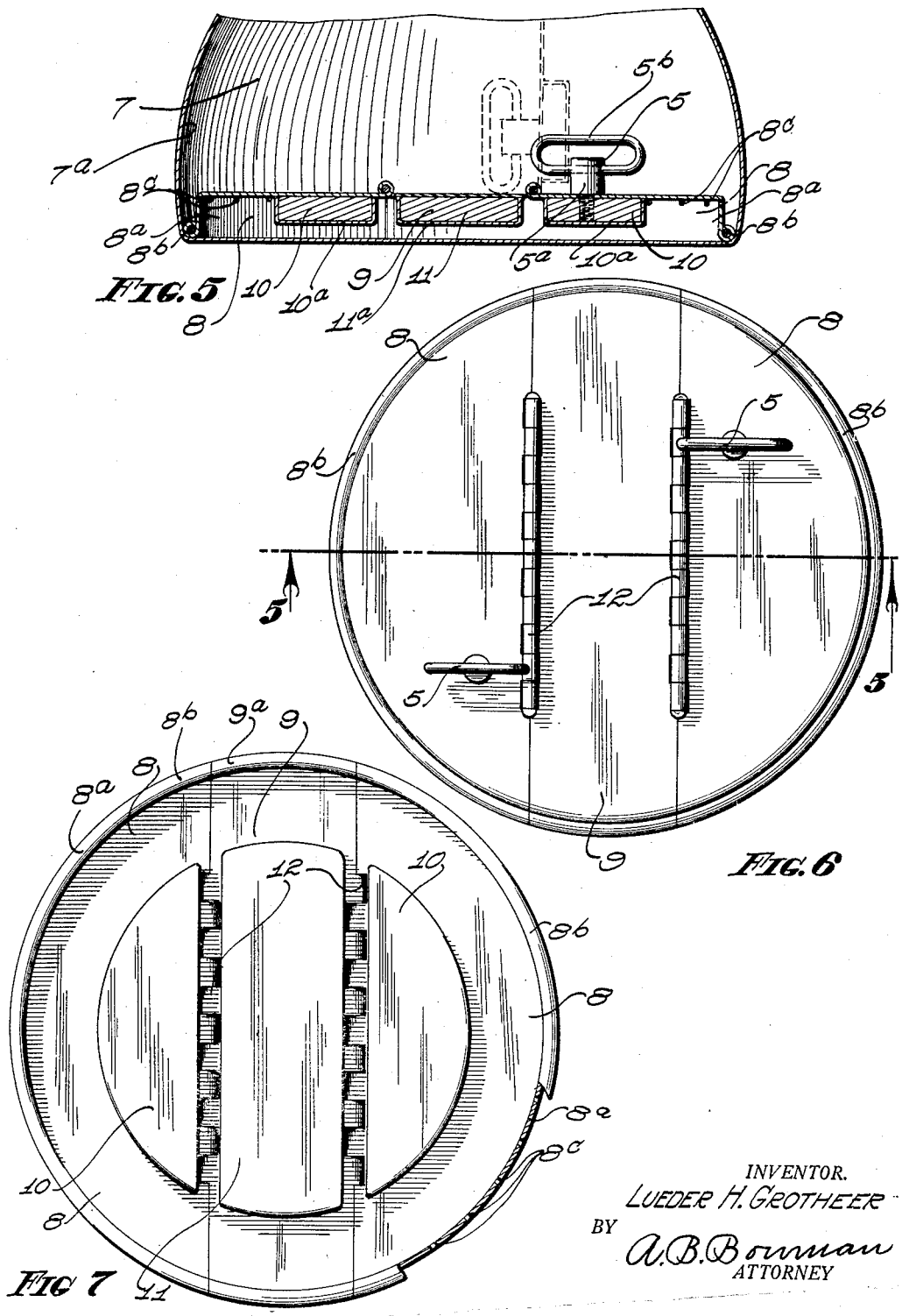

1,750,265

UNITED STATES PATENT OFFICE

LUEDER H. GROTHEER, OF SAN DIEGO, CALIFORNIA

MINIATURE STEAM-COOKING DEVICE

Application filed June 8, 1929. Serial No. 369,322.

My invention relates to steam cooking utensils, and the objects of my invention are: First, to provide a cooker of this type for preparing food without the necessity of stirring the food while cooking; second, to provide an apparatus of this class which prevents burning and waste of food and economizes in fuel consumption; third, to provide a cooking utensil in which the food is held above the bottom of the utensil by means of a removable false bottom; fourth, to provide a false bottom for a cooking utensil which allows the water to circulate in such a manner as to cause the generation of steam within the utensil while supporting the food clear of the water therein; fifth, to provide a cooking utensil having a false bottom of the class de-described which may be variously weighted and which has good heat conducting and retaining qualities; sixth, to provide a movable false bottom of this class for cooking utensils which can be readily removed for cleansing; seventh, to provide a false bottom of this class which may be folded so as to be adapted for use in vessels having openings of reduced size relative to the area of their bottoms, and eighth, to provide a novel cooker of this class which is economical of construction, simple and durable, and which will not readily deteriorate or get out of order.

With these and other objects in view as will appear hereinafter, my invention consists of certain novel features of construction, combination and arrangement of parts and portions as will be hereinafter described in detail and particularly set forth in the appended claims, reference being had to the accompanying drawings and to the characters of reference theron which form a part of this application, in which:

Figure 1 is a sectional view of the preferred form of my device showing the upper portion of the utensil broken away, portions of the false bottom being shown in elevation; Fig. 2 is an elevational view of the fastening member used for holding the covered portion to the false bottom member; Fig. 3 is a fragmentary plan view of the false bottom member; Fig. 4 is a fragmentary bottom view thereof; Fig. 5 is a sectional view of a modified form; Fig. 6 is a plan view thereof, and Fig. 7 is a bottom view thereof, portions being broken away to facilitate the illustration.

Similar characters of reference refer to similar parts and portions throughout the several views of the drawings.

The cooking utensil 1, false bottom 2, weight members 3, weight cover 4, and fastening screw 5 form the principal parts and portions of the preferred form of my novel cooking utensil.

Segmental portions 8, central portion 9, weights 10 and 11, and hinges 12, form the principal parts and portions of the modified form of false bottom herein described.

The receptacle 1 may be any conventional cooking utensil, such as a saucepan or a boiler having relatively high walls $1^a$ and substantially flat bottom $1^b$. The false bottom member 2 is preferably cast in a single piece of aluminum or similar metal and is preferably of circular form. The bottom side thereof is made slightly concave and is provided with a plurality of lugs $2^a$ at its periphery, forming legs for supporting the bottom of the false member 2 in spaced relation with the bottom of the pan in which it is placed. The dimensions of the false bottom member are such as to allow a slight clearance between the sides thereof and the utensil in which it is placed.

Concavity of the lower surface of the false bottom 2 allows for the usual slight buckling of the bottom of a saucepan and prevents the latter from coming in contact with the lower surface of the false bottom member, thus preserving the spacing. The upper surface of the false bottom member 2 slopes upwardly from the periphery towards the center. An annular recess is provided around the center of the false bottom forming a central boss $2^b$. Annular rib portions $2^c$ and $2^d$ project from the upper surface of the false bottom member, positioned respectively around the outer rim of the central recess, and around the periphery of the false bottom member. The apex of these ribs lie in a slightly downwardly sloping line with respect to the central portion of the false bottom member. The recess is provided with a cover 4 which tapers from its center downwardly towards the outer rim of the recess. Within said recess are placed a quantity of weight members 3 for the purpose of making the false bottom member heavier and preventing it from being excessively agitated by the steam generated thereunder when light food is placed on the upper side or when using the utensil as a boiler, in which case the false bottom member would be completely submerged.

A suitable washer 6 forms a liquid proof joint between the cover 4 and the false bottom member 2. The boss member $2^b$ is provided with an axially extending threaded screw hole for receiving the fastening screw 5, by means of which the cover 4 is held in place.

A washer 7 is positioned around the screw between the upper face of the boss $2^b$ and the lower face of the cover 4 for preventing leakage of steam through into the recess.

The screw 5 is provided with a pivotally mounted grip portion $5^b$ preferably made of a wire bent into a loop, the ends thereof projecting into radially extending holes in the cylindrical head portion $5^a$ of the screw, as clearly illustrated in Fig. 2. As shown in Fig. 1, the grip portion $5^b$ may be rotated to a horizontal position so as to be out of the way of food placed over the false bottom member. For ensuring circulation of the steam generated, a plurality of openings $2^e$ and $2^f$ are provided in the ribs $2^c$ and $2^d$, as best shown in Fig. 3.

In the modified form of my invention the false bottom member comprises a pair of sheet metal segmental portions 8 and central portion 9, the outer rims of said portions forming substantially a circle, as clearly indicated in Fig. 6. The margins of said segmental portions and central portion are bent at right angles forming the flanges $8^a$ and $9^a$, the edges of which are preferably beaded, as at $8^b$, for providing a smooth edge. The segmental portions 8 are hinged to the central portion 9 by means of the hinges 12 and are adapted to fold upwardly into the vertical position indicated by dotted lines in Fig. 5. On the lower side of each portion of the false bottom member are provided weight members 10 and 11, also preferably segmental in form and mounted substantially concentrically relative to the axis of the false bottom portion, as best shown in Fig. 7. The weights 10 and 11 are preferably supported within cases $10^a$ and $11^a$ which are soldered or otherwise secured to the lower side of the portions 8 and 9. A plurality of apertures $8^c$ extend through the flanged portion $8^a$ preferably near the upper margins thereof providing for the proper circulation of water and steam between the upper and lower surfaces of the false bottom member. A pair of grip members 5, of the type described in connection with my preferred form, are secured to the segmental portions 8, preferably at opposite ends thereof, as shown in Fig. 6. The loop portions $5^b$ of said grip members extend preferably at right angles to the hinges 12 and are adapted to support the segmental portions 8 in a vertical position, as indicated in dotted lines in Fig. 5, the one end of said loop member resting on the upper surface of the central portion 9.

When it is desired to cook food by steaming, a relatively small amount of water is placed inside the utensil and the food, such as vegetables or pieces of meat, is placed over the upper surface of the false bottom 2, resting chiefly on top of the ribs $2^c$ and $2^d$. When heat is applied to the bottom of the cooking utensil the water between the bottom of the utensil and the false bottom member is quickly brought to a boiling point causing rapid circulation of the water and generation of steam within the utensil. Heat is rapidly absorbed by the relatively thick false bottom member 2, the heat being conducted to the upper surface thereof and passed off into the food positioned thereon. The temperature of the false bottom member 2 can, however, not reach a degree which would cause food resting thereon to be burnt as it is completely surrounded by water and steam, thereby limiting its temperature. While under ordinary conditions food resting on the bottom of the utensil would be burnt and portions thereof spoilt, by the use of my false bottom member this objectionable feature is entirely obviated and the food is subjected to a relatively equal temperature over all exposed portions thereof. In addition to this advantage the false bottom prevents the bottom of the pan from being discolored due to the adhesion of and burning thereon of particles of food. Thus reducing or practically eliminating the necessity of scalding pans after their use in preparing food. The false bottom member 2 may be readily removed from the hot liquid within the pan by inserting a fork into the loop shaped grip member $5^b$, the width of the loop being such as to enable the prongs of a fork to be inserted therein. The amount of the weight 3 placed inside the recess may be varied as required to meet various conditions. If it is desired to prevent the false bottom member 2 from being agitated by steam passing between the bottom of the pan and the false bottom member 2, the recess may be entirely filled with the weights 3. But if a certain agitation of the false bottom member is desired, the weights may be removed, thereby considerably lightening the false bottom member which in consequence will be agitated to a greater extent by the pressure of the steam generated under it.

The modified form of my device illustrated in Figs. 5, 6 and 7, lends itself more particularly for use in utensils in which the bottom is of greater area than the upper opening, as indicated by the vessel 7 shown fragmentarily in Fig. 5, in which the walls 7ª curve inwardly towards the top. To facilitate the introduction of the false bottom member the latter is folded to the position in which the segmental portions 8 extend at right angles to the central portion 9 and are introduced through the opening in the utensil and are then allowed to straighten out as space becomes available towards the bottom thereof.

It is obvious that my false bottom member may be made in various shapes and sizes, and though I have shown and described a particular construction, combination and arrangement of parts and portions, and a certain modification thereof, I do not wish to be limited to this particular construction, combination and arrangement, nor to the modification, but desire to include in the scope of my invention the construction, combination and arrangement substantially as set forth in the appended claims.

Having thus described my invention, what I claim as new and desire to secure by Letters Patent is:

1. In a steam cooking device, a receptacle, a false bottom member loosely positioned therein, means for supporting said false bottom member in spaced relation with the bottom of said receptacle, the periphery of said false bottom member being in slight spaced relation with the walls of said receptacle, the upper surface of said fales bottom member forming alternate annular ridges and recesses, a central annular recess in the upper side of the false bottom member, removable weight means positioned in said recess and a cover positioned over said recess.

2. The combination with a receptacle, of a false bottom means adapted to be positioned loosely therein, means for supporting the lower surface of said false bottom means in raised position relative to the bottom of said receptacle, and means for varying the weight of said false bottom means.

3. The combination with a receptacle, of a false bottom member adapted to be positioned loosely within said receptacle on the bottom thereof, the lower surface of said false bottom means being slightly concave, the upper surface thereof forming concentric integral rib members, and a central axially extending boss member, an annular recess formed in the upper side of said false bottom member around said boss member, a plurality of weight members positioned within said recess, a cover extending over said recess and forming a liquid proof joint at its outer margin with the rim of said recess, and screw means extending within said boss for removably securing said cover to said false bottom member.

In testimony whereof, I have hereunto set my hand at San Diego, California, this 29th day of May, 1929.

LUEDER H. GROTHEER.